United States Patent
Gartside et al.

(10) Patent No.: US 9,002,771 B2
(45) Date of Patent: Apr. 7, 2015

(54) SYSTEM, METHOD, AND COMPUTER PROGRAM PRODUCT FOR APPLYING A RULE TO ASSOCIATED EVENTS

(71) Applicant: McAfee, Inc., Santa Clara, CA (US)

(72) Inventors: Paul Nicholas Gartside, Newport Pagnell (GB); Michael G. Bishop, Thame (GB)

(73) Assignee: McAfee, Inc., Santa Clara, CA (US)

( * ) Notice: Subject to any disclaimer, the term of this patent is extended or adjusted under 35 U.S.C. 154(b) by 14 days.

(21) Appl. No.: 13/685,939

(22) Filed: Nov. 27, 2012

(65) Prior Publication Data

US 2013/0086632 A1    Apr. 4, 2013

Related U.S. Application Data

(63) Continuation of application No. 12/033,465, filed on Feb. 19, 2008, now Pat. No. 8,341,105.

(51) Int. Cl.
| | |
|---|---|
| G06N 5/00 | (2006.01) |
| G06F 21/50 | (2013.01) |
| G06N 5/02 | (2006.01) |

(52) U.S. Cl.
CPC ............... *G06F 21/50* (2013.01); *G06N 5/025* (2013.01)

(58) Field of Classification Search
CPC ....................................................... G06N 5/00
USPC .......................................................... 706/47
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |

OTHER PUBLICATIONS

Damiani ("P2P-Based Collaborative Spam Detection and Filtering" 2004).*
José-Marcio Martins da Cruz ("Mail filtering on medium/huge mail servers with j-chkmail" 2005).*
Theo Van Dinter "New and Upcoming Features in SpamAssassin V3" Nov. 15, 2004, 43 pages.
Alan Schwartz "The open source solution to SPAM" 2004, [online], [retrieved on May 25, 2011], Retrieved from the Internet:<URL:http://www.net-security.org/dl/chapters/spam_ch02.pdf>, chapter 2 only, 25 pages.
SpamAssassinTM project "Mail::SpamAssassin—Spam detector and markup engine", last modified Oct. 10, 2006, [online], [retrieved on May 25, 2011], Retrieved from the Internet:<URL:http://spamassassin.apache.org/full/3.1.x/doc/Mail_SpamAssassin.html> 9 pages.
SpamAssassinTM project (Mail::SpamAssassin::Conf—SpamAssassin configuration rile, last modified Oct. 10, 2006), online], URL:http://spamassassing.apache.org/full/3.1.x/doc/Mail_SpamAssassin_Conf.html> 26 pages.

(Continued)

*Primary Examiner* — Lut Wong
(74) *Attorney, Agent, or Firm* — Patent Capital Group

(57) ABSTRACT

A system, method, and computer program product are provided for applying a rule to associated events. In use, a plurality of events is associated based on at least one identifier. Additionally, at least one rule is applied to the associated events. Further, a reaction is performed based on the application of the at least one rule.

20 Claims, 6 Drawing Sheets

(56) References Cited

OTHER PUBLICATIONS

Kahunaburger "Spam Assassin and Movable Type" Jan. 2004, [online], [retrieved on May 25, 2011], Retrieved from the Internet:<URL:http://www.kahunaburger.com/2005/01/11/spam-assassin-andmovable-type/>, 8 pages.

SpamAssassin "Test Performed: v3.0.x" archived on Dec. 29, 2004, [online], [retrieved on May 26, 2011], Retrieved from the Internet:<URL:http://web.archive.org/web/20041229152741/http://spamassassin.apache.org/tests_3_0_x.html>, 23 pages.

SpamAssassinTM project ("Index of /full/3.1.x/doc", last modifed Oct. 10, 2006, [online], [retrieved on May 25, 2011], Retrieved from the Internet<URL:http://spamassassin.org/full/3.1.x/doc/> 4 pages.

* cited by examiner

SYSTEM, METHOD, AND COMPUTER PROGRAM PRODUCT FOR APPLYING A RULE TO ASSOCIATED EVENTS

RELATED APPLICATION

This Application is a continuation (and claims the benefit of priority under 35 U.S.C. §120) of U.S. application Ser. No. 12/033,465, filed Feb. 19, 2008, now U.S. Pat. No. 8,341,105, entitled "SYSTEM, METHOD, AND COMPUTER PROGRAM PRODUCT FOR APPLYING A RULE TO ASSOCIATED EVENTS," Inventor(s) Paul Nicholas Gartside, et al. The disclosure of the prior application is considered part of (and is incorporated by reference in) the disclosure of this application.

FIELD OF THE INVENTION

The present invention relates to applying rules of data, and more particularly to applying rules to events.

BACKGROUND

Traditionally, rules have been applied to events for detecting unwanted activity. Sometimes, such unwanted activity has included data leakage, malware, etc. However, conventional techniques for applying rules to events have generally exhibited various limitations. Just by way of example, rules have traditionally only been applied to individual events, thus preventing detection of unwanted activity that spans multiple events. There is thus a need for overcoming these and/or other issues associated with the prior art.

SUMMARY

A system, method, and computer program product are provided for applying a rule to associated events. In use, a plurality of events is associated based on at least one identifier. Additionally, at least one rule is applied to the associated events. Further, a reaction is performed based on the application of the at least one rule.

DETAILED DESCRIPTION

Figure 1:
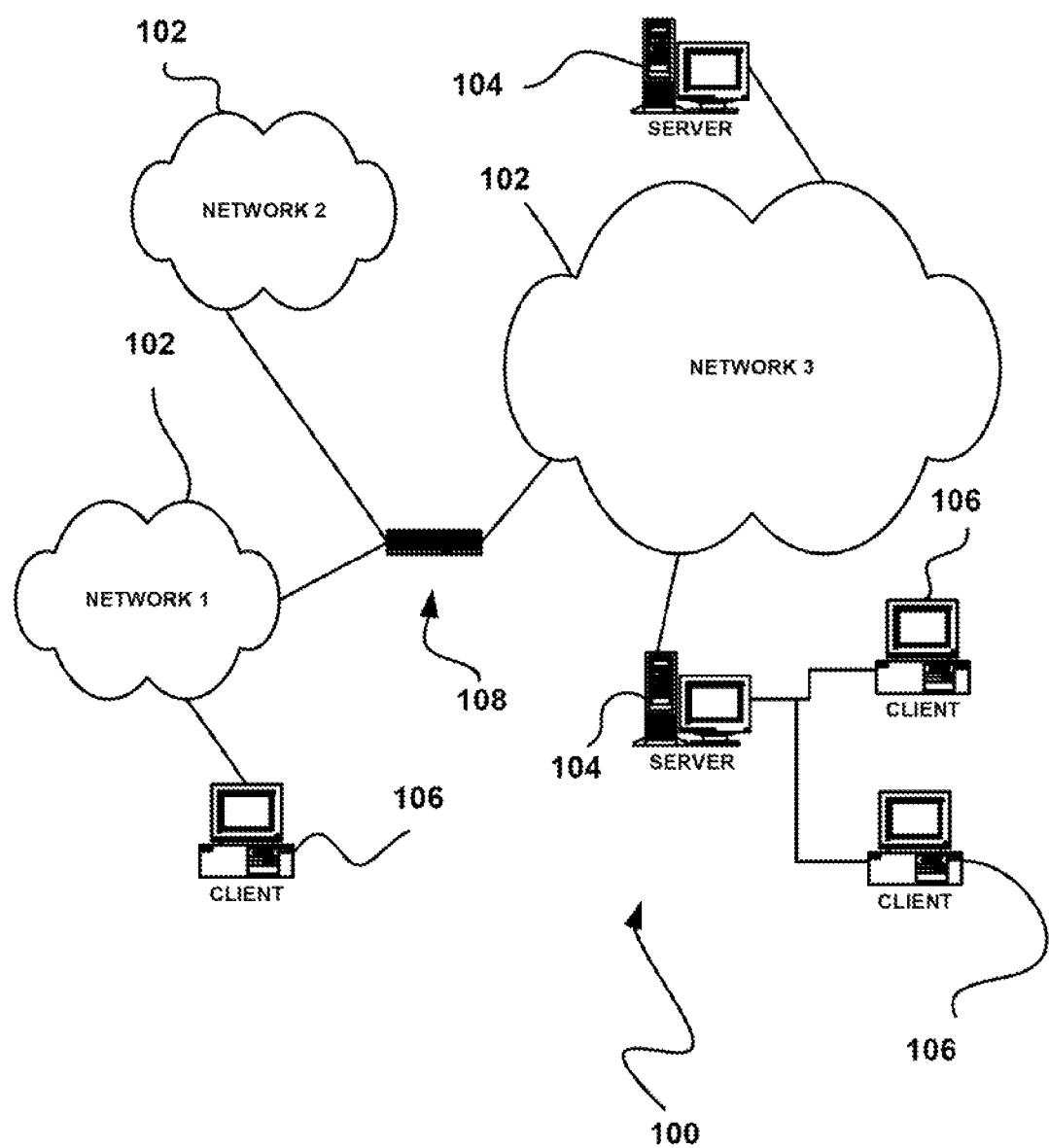
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
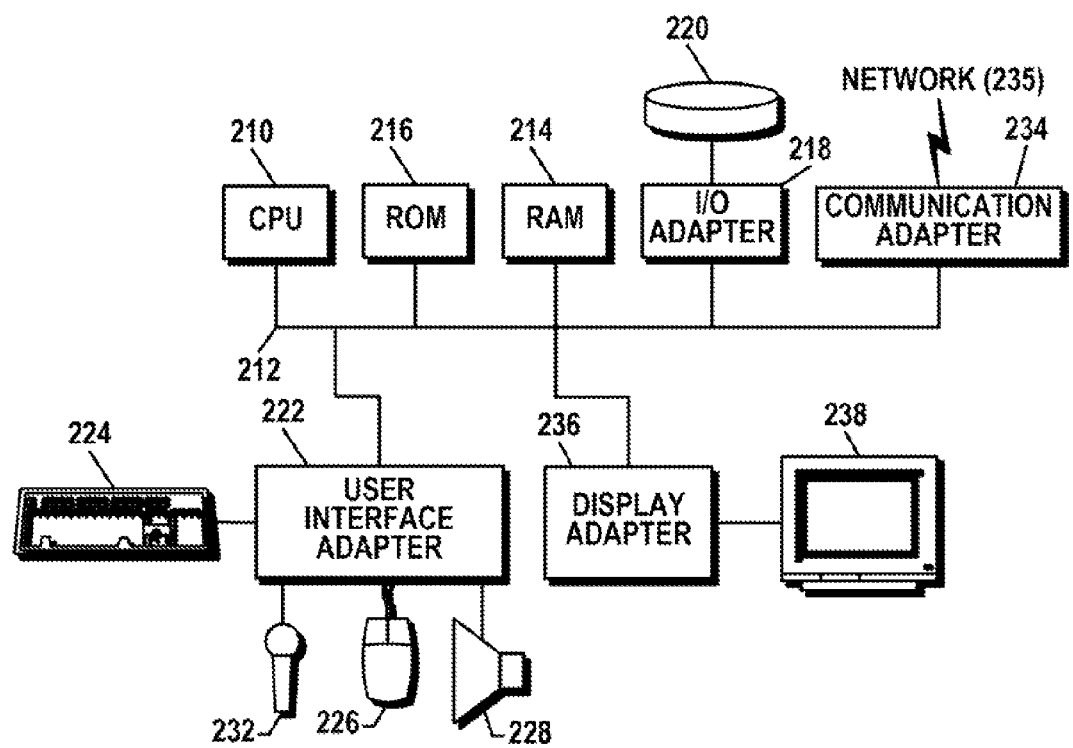
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
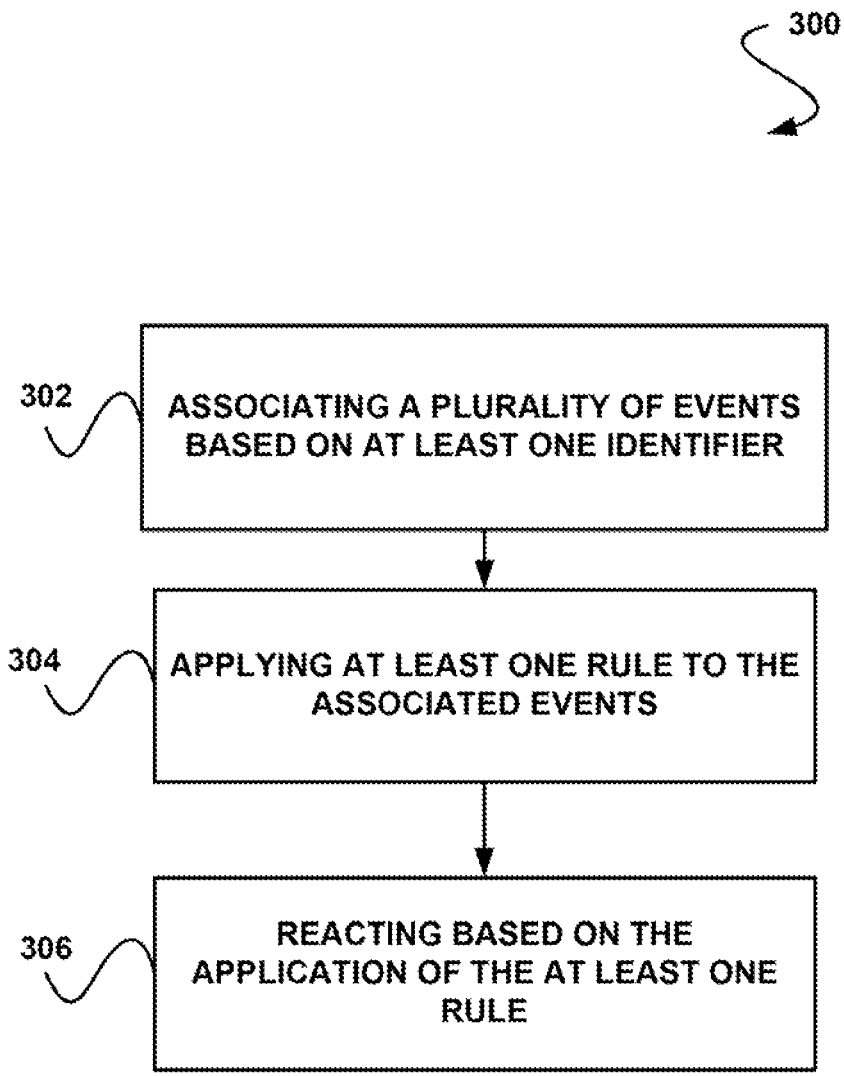
FIG. 3 shows a method for applying a rule to associated events, in accordance with one embodiment.

FIG. 3 shows a method 300 for applying a rule to associated events, in accordance with one embodiment. As an option, the method 300 may be carried out in the context of the architecture and environment of FIGS. 1 and/or 2. Of course, however, the method 300 may be carried out in any desired environment.

As shown in operation 302, a plurality of events is associated based on at least one identifier. In the context of the present description, the events may include any actions, occurrences, etc. capable of being associated. In one embodiment, the events may each include a separate communication of data. As an option, the data may be communicated over a network. For example, the events may include electronic mail (email) messages, short message service (SMS) messages, multimedia messaging service (MMS) messages, etc. As another example, the events may include posting data on a web page [e.g. utilizing a web log(blog), etc.].

As an option, the events may be associated with different devices and/or a single device. Such devices may include any of the devices described above with respect to FIGS. 1 and/or 2. For example, the events may each be initiated by a different device or the same device.

Additionally, the identifier based on which the events are associated may include any identifier of information that is common to each of the events. In one embodiment, the identifier may include a domain. For example, the domain may include a domain of a device associated with the event, such as a domain of source of the event or optionally a destination of the event. Thus, events with a common domain may be associated based on the domain.

In another embodiment, the identifier may include an address. Such address may optionally include an email address, an Internet protocol (IP) address, etc. Further, the address may be an address of a source of the event (e.g. a device at which the event initiated, etc.), an address of a destination of the event (e.g. a device to which the event is destined, etc.). In this way, events with a common address may optionally be associated based on such address, for example.

Further, the events may be associated in any desired manner that is based on the identifier. Just by way of example, an indication of the events may be stored in a database in association with one another. Such indication may include any data associated with the event (e.g. content of the event, a time of the event, a source of the event, a destination of the event, etc.). As another example, the events may be associated by aggregating the events and/or any of the data associated with such events.

Still yet, at least one rule is applied to the associated events, as shown in operation 304. With respect to the present description, the rule may include any policy, parameters, etc. capable of being applied to the associated events. The rule may optionally be user configured. For example, the rule may include a security rule utilized for indicating whether the associated events include unwanted activity. In addition, applying the rule to the associated events may include determining whether the associated events match the rule. For example, the match may include a literal match or a regular expression match.

In one embodiment, the rule may include a threshold. For example, if the associated events exceed the threshold, the rule may indicate that the associated events include unwanted activity. As an option, the threshold may include a score. In addition, each of the associated events may be scored (e.g. based on predetermined criteria, etc). Just by way of example, predetermined content (e.g. a social security number, an account number, a birthdate, a name, etc.) capable of being included in each of the events may be configured with a particular score. To this end, an aggregate score of the associated events may be determined and compared with the threshold score for applying the rule to the associated events.

As another option, the threshold may include a count. Such count may include a predetermined number of instances of a particular type of content or a particular combination of different types of content. Accordingly, a number of the associated events may be counted and compared to the threshold count for applying the rule to the associated events.

In another embodiment, the rule may include at least one condition. Just by way of example, the rule may include any number of Boolean conditions (e.g. AND, OR, etc.). To this end, applying the rule to the associated events may optionally include determining whether the associated events satisfy the condition.

As an option, content corresponding to the events may be aggregated, such that the rule may be applied to the aggregated content. As another option, the content may be aggregated in response to the association of the events. For example, a body of each of a plurality of associated emails may be aggregated for applying the rule to the aggregated bodies of emails.

As yet another option, a first portion of a rule may be applied to a first one of the events to generate a first result and a second portion of the rule may be applied to a second one of the events to generate a second result. Thus, multiple portions of a single rule may optionally be applied to each of the associated events. Just by way of example, each condition included in the rule may be applied to a different one of the associated events.

As still yet another option, a different rule may be applied to each of the events. For example, each of the different rules applied to each of the events may be included in a group of rules. Such group of rules may be predefined, such that it may be determined whether the events collectively satisfy all of the rules in the group.

In one embodiment, the rule may be conditionally applied to the associated events based on a temporal proximity. Such temporal proximity may optionally be user configurable (e.g. by an administrator, etc.). In various examples, the temporal proximity may include a predetermined number of hours, days, months, etc.

In another embodiment, the rule may only be applied to associated events identified within the temporal proximity. For example, a time between identification of a first one of the events and identification of a second one of the events may be compared to the temporal proximity for determining whether to apply the rule to such first event and second event. To this end, the temporal proximity may optionally be utilized for reducing false positive results associated with applying the rule to events identified outside of the temporal proximity from one another.

Moreover, as shown in operation 306, a reaction is performed based on the application of the at least one rule. In one embodiment, the reaction may be performed if the associated events satisfy the rule. Just by way of example, the reaction may be performed if the associated events meet or exceed a threshold indicated by the rule, satisfy any conditions included in the rule, etc.

In another embodiment, the reacting may be based on a first result generated from applying a first portion of the rule to a first one of the events and a second result generated from applying a second portion of the rule to a second one of the events. As an option, the reacting may be based on a Boolean operation involving the first result and the second result. For example, if the first result and the second result both indicate that the rule is satisfied (e.g. the first result indicates that a first condition of the rule is met and the second result indicates that a second condition of the rule is met, etc.), the reaction may be performed.

As another option, the reacting may be based on a scoring operation involving the first result and the second result. For example, if a sum of the first result and the second result (e.g. a score of the first result summed with a score of the second result, etc.) indicates that the rule is satisfied, the reaction may be performed. As yet another option, the reacting may be based on a threshold involving the first result and the second result. Just by way of example, if a count determined from the first result and the second result (e.g. by summing a count associated with the first result and a count associated with the second result, etc.) indicates that the rule is satisfied, the reaction may be performed.

Furthermore, the reaction may include any action capable of being performed based on the application of the at least one rule. The reaction may be specified by the rule, in one embodiment. In another embodiment, the reaction may be preconfigured by a user.

As an option, the reaction may include reporting the associated events (e.g. alerting a user of the associated events, logging the associated events, etc.). As another option, the reaction may include blocking the associated events. Of course, however, the reaction may also include blocking one of the associated events, such as a last identified one of the associated events.

As yet another option, the reaction may include blocking events identified subsequent to the associated events that correspond to the identifier of the associated events. For example, subsequently identified events sent from a source of the associated events may be blocked. With respect to such example, the subsequently identified results may optionally be sent from a source with an email address, IP address, domain, etc. from which the associated events were sent.

As still yet another option, the reaction may include archiving events identified subsequent to the associated events that correspond to the identifier of the associated events. Such archiving may be performed for audit purposes, reporting purposes, etc. Moreover, the reaction may also optionally include quarantining the associated events, archiving the associated events, etc.

In this way, at least one rule may be applied across multiple events that are associated based on at least one identifier. In addition, a reaction may be performed if the multiple events collectively satisfy the rule. Accordingly, events attempting to evade detection by dividing portions of unwanted activity across such events may be identified utilizing the rule and a reaction may thus be performed.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
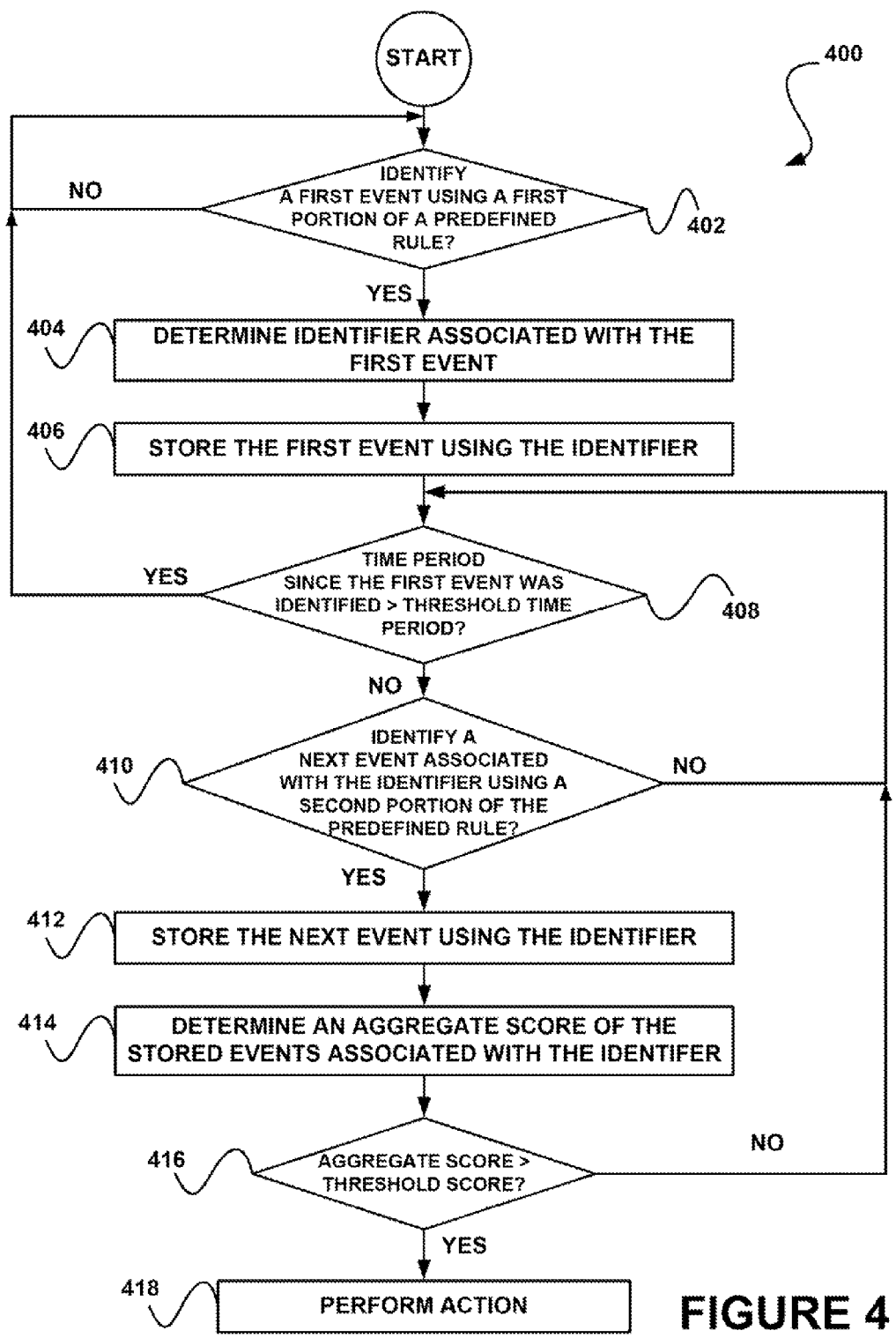
FIG. 4 shows a method for applying a threshold score to an aggregate score associated events, in accordance with another embodiment.

FIG. 4 shows a method 400 for applying a threshold score to an aggregate score associated events, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether a first event is identified using a first portion of a predefined rule. In one embodiment, events received by a security system (e.g. at a gateway, etc.) may be scanned utilizing a plurality of predefined rules (e.g. user configured rules, etc.) for determining whether any of such events satisfy a first portion of one of the predefined rules. The first portion of the predefined rule may include a condition included in the predefined rule, for example.

Once it is determined that the first event is identified using the first portion of the predefined rule, an identifier associated with the first event is determined. Note operation 404. The identifier may include any desired type of identifier. For example, the identifier may identify the source of the first event, a destination of the first event, etc.

As an option, the type of identifier that is determined may be based on the type of the first event. Just by way of example, if the first event includes an email message, the identifier that is determined may include an IP address of a device that sent the email message. As another option, the type of identifier that is determined may be predetermined by a user. Of course, while only a single identifier is described with respect to the present embodiment, it should be noted that any combination of different identifiers associated with the first event may be determined.

Additionally, as shown in operation 406, the first event is stored using the identifier. In one embodiment, the first event may be stored in a database of identified events. As an option, the first event may be stored with respect to the identifier, such that all identified events associated with the identifier may be stored as a group. As another option, any information associated with the first event may also be stored, such as a time the first event was identified, for example.

Furthermore, it is determined in decision 408 whether a time period since the first event was identified has exceeded a threshold time period. The threshold time period may be user configured, for example. The threshold time period may include a temporal proximity, such that it may be determined whether the first event was identified within the temporal proximity.

If it is determined that the time period since the first event was identified has exceeded the threshold time period, it is determined whether a next event has been identified using a first portion of a predefined rule (decision 402). In addition, the first event may optionally be removed from the database storing such first event.

If, however, it is determined that the time period since the first event was identified has not exceeded the threshold time period, it is further determined whether a next event associated with the identifier has been identified using a second portion of the predefined rule. Note decision 410. In one embodiment, the second portion of the predefined rule may be different from the first portion of the predefined rule used to identify the first event. For example, the second portion may include another condition included in the predefined rule.

If it is determined in decision 410 that a next event associated with the identifier has not been identified using the second portion of the predefined rule, it is again determined whether a time period since the first event was identified has exceeded the threshold time period. In this way, once the threshold time period has been met without identifying a next event associated with the identifier using the second portion of the predefined rule, the method 400 may terminate identification of such next event. If it is determined in decision 410 that a next event associated with the identifier has been identified using the second portion of the predefined rule, the next event is stored using the identifier. Note operation 412. To this end, the next event may be stored in association with the first event.

Further, as shown in operation 414, an aggregate score of the stored events associated with the identifier is determined. In one embodiment, content of the first event and content of the next event may each be scored based on predetermined criteria. For example, different types of data capable of being included in the content of the first event and content of the next event may be predetermined to be associated with a particular score. The score of the first event and the score of the next event may optionally be user configurable (e.g. configured by an administrator, etc.). Thus, a score of the first event and a score of the next event may be aggregated for determining the aggregate score.

Still yet, it is determined whether the aggregate score exceeds a threshold score, as shown in decision 416. As an option, the threshold score may be indicated by the predefined rule. As another option, the threshold score may be user configurable. If the aggregate score does not exceed the threshold score, the method 400 returns to decision 408 for determining whether the time period since the first event was identified exceeds the threshold time period.

Accordingly, a plurality of events associated with a common identifier may be identified using different portions of the predefined rule until a time period since the first event exceeds the threshold time period (decision 408) or an aggregate score of the events exceeds a threshold score (decision 416). If the aggregate score exceeds the threshold score, an action is performed. Note operation 418. The action may include blocking the first event and/or the next event, reporting the first event and/or the next event, etc.

Figure 5:
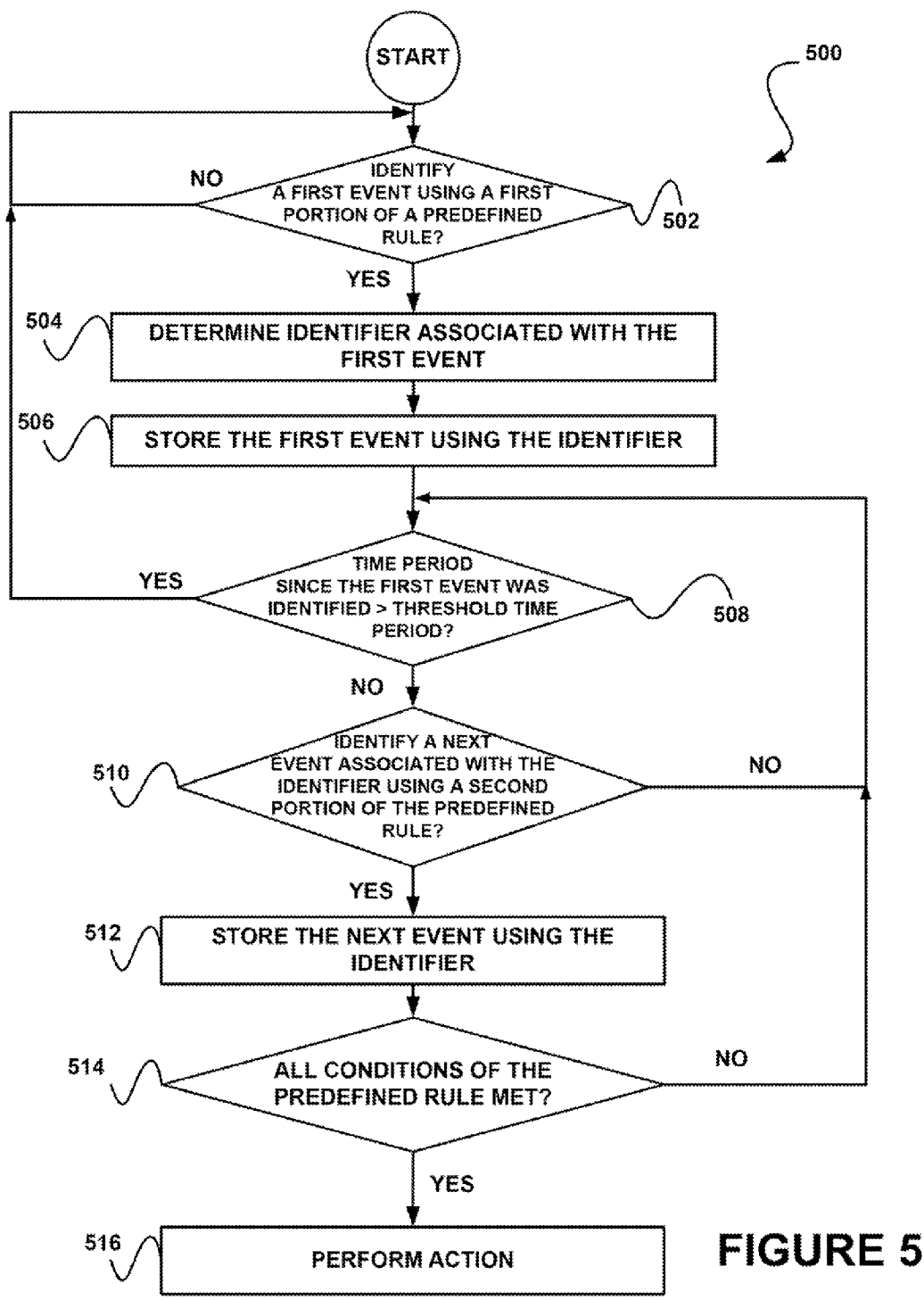
FIG. 5 shows a method for applying multiple portions of a rule to associated events, in accordance with yet another embodiment.

FIG. 5 shows a method 500 for applying multiple portions of a rule to associated events, in accordance with yet another embodiment. As an option, the method 500 may be carried out in the context of the architecture and environment of FIGS. 1-4. Of course, however, the method 500 may be carried out in any desired environment. Again, it should be noted that the aforementioned definitions may apply during the present description.

As shown in decision 502, it is determined whether a first event is identified using a first portion of a predefined rule. In one embodiment, events received by a security system (e.g. at a gateway, etc.) may be scanned utilizing a plurality of predefined rules for determining whether any of such events satisfy a first portion of one of the predefined rules. The first portion of the predefined rule may include a condition included in the predefined rule, for example.

Once it is determined that the first event is identified using the first portion of the predefined rule, an identifier associated with the first event is determined. Note operation 504. The identifier may include any desired type of identifier. For example, the identifier may identify the source of the first event, a destination of the first event, etc.

As an option, the type of identifier that is determined may be based on the type of the first event. Just by way of example, if the first event includes an email message, the identifier that is determined may include an IP address of a device that sent the email message. As another option, the type of identifier that is determined may be predetermined by a user. Of course, while only a single identifier is described with respect to the present embodiment, it should be noted that any combination of different identifiers associated with the first event may be determined.

Additionally, as shown in operation 506, the first event is stored using the identifier. In one embodiment, the first event may be stored in a database of identified events. As an option, the first event may be stored with respect to the identifier, such that all identified events associated with the identifier may be stored as a group. As another option, any information associated with the first event may also be stored, such as a time the first event was identified, for example.

Furthermore, it is determined in decision 508 whether a time period since the first event was identified has exceeded a threshold time period. The threshold time period may be user configured, for example. The threshold time period may include a temporal proximity, such that it may be determined whether the first event was identified within the temporal proximity.

If it is determined that the time period since the first event was identified has exceeded the threshold time period, it is determined whether a next event has been identified using a first portion of a predefined rule (decision 502). In addition, the first event may optionally be removed from the database storing such first event.

If, however, it is determined that the time period since the first event was identified has not exceeded the threshold time period, it is further determined whether a next event associated with the identifier has been identified using a second portion of the predefined rule. Note decision 510. In one embodiment, the second portion of the predefined rule may be different from the first portion of the predefined rule used to identify the first event. For example, the second portion may include another condition included in the predefined rule.

If it is determined in decision 510 that a next event associated with the identifier has not been identified using the second portion of the predefined rule, it is again determined whether a time period since the first event was identified has exceeded the threshold time period. In this way, once the threshold time period has been met without identifying a next event associated with the identifier using the second portion of the predefined rule, the method 500 may terminate identification of such next event. If it is determined in decision 510 that a next event associated with the identifier has been identified using the second portion of the predefined rule, the next event is stored using the identifier. Note operation 512. To this end, the next event may be stored in association with the first event.

Furthermore, as shown in decision 514, it is determined whether all conditions of the predefined rule have been met. In one embodiment, it may be determined that all of the conditions of the predefined rule have been met if the first portion of the rule used to identify the first event and the second portion of the rule used to identify the next event encompass all of the conditions of the predefined rule. In another embodiment, it may be determined that all of the conditions of the predefined rule have been met if the first event and the next event satisfy all of such conditions.

If it is determined that all of the conditions of the predefined rule have not been met, the method 500 returns to decision 508 for determining whether the time period since the first event was identified exceeds the threshold time period. Accordingly, a plurality of events associated with a common identifier may be identified using different portions of the predefined rule until a time period since the first event exceeds the threshold time period (decision 508) or until it is determined that all of the conditions of the predefined rule have been met (decision 514).

If it is determined that all of the conditions of the predefined rule have been met, an action is performed. Note operation 516. The action may include blocking the first event and/or the next event, reporting the first event and/or the next event, etc.

Figure 6:
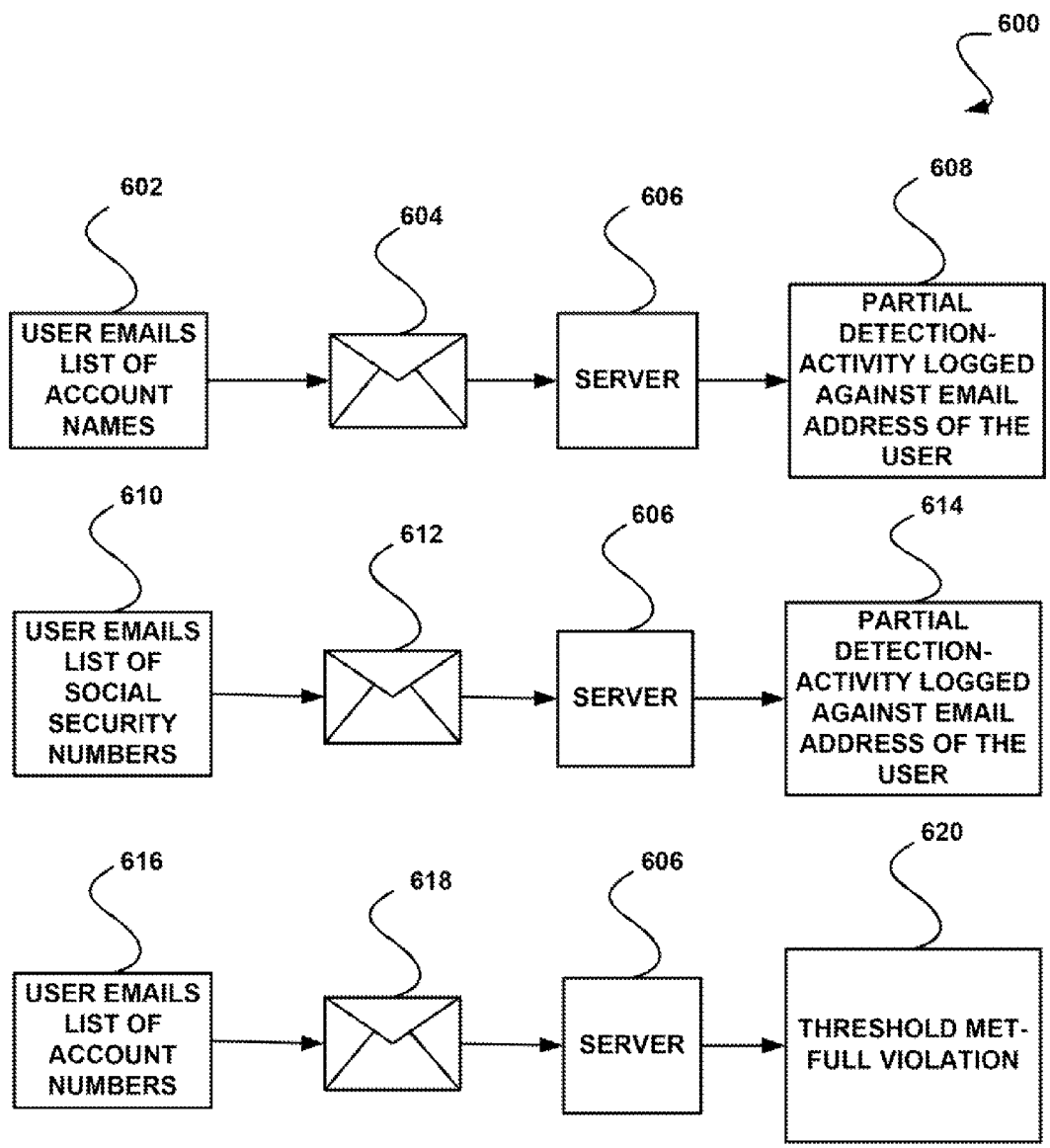
FIG. 6 shows a system for applying multiple portions of a rule to electronic mail messages sent by a single user, in accordance with still yet another embodiment.

FIG. 6 shows a system 600 for applying multiple portions of a rule to electronic mail messages sent by a single user, in accordance with still yet another embodiment. As an option, the system 600 may be implemented in the context of the architecture and environment of FIGS. 1-5. Of course, however, the system 600 may be implemented in any desired environment. Yet again, it should be noted that the aforementioned definitions may apply during the present description.

As shown in operation 602, a user sends a first email 604 including a list of account names. The user may include any user of a device capable of be utilized to send the email. In addition, in one embodiment, the account names may include names of account providers (e.g. bank account providers, credit card account providers, etc.).

The first email 604 is sent over a network to a server 606. The network may include any type of network, such as any of the networks described above with respect to FIG. 1. Additionally, the server 606 may include, as an option, an email server utilized for routing the emails from a source to a destination designated by such emails. As another option, the server 606 may include a security system for detecting unwanted activity associated with received emails.

The server 606 scans the first email 604 using a plurality of predefined rules for determining whether the first email 604 meets a portion of any of the predefined rules. As shown, it is determined that the first email 604 meets a first portion of one of the predefined rules, such that a partial detection of unwanted activity is identified (see operation 608). For example, the first portion of the predefined rule may indicate that account names are a partial detection of unwanted activity, such that the account names included in the first email 604 may meet the first portion of the predefined rule.

The first email 604 is logged against the email address of the user, as in operation 608. As an option, a notification may be sent to an administrator, the user, etc. for providing a notification of the partial detection. Of course, while the server 606 is shown, it should be noted that as another option, the first email 604 (and any subsequent emails) may also be identified at a device (e.g. workstation, etc.) on which the first email 604 is generated by the user. Such device may be utilized for scanning the first email 604, etc. in the manner described above.

Also, as shown in operation 610, the user sends a second email 612 including a list of social security numbers. For example, the second email 612 may be sent from the same email address as the first email 604. In this way, the first email 604 and the second email 612 may be associated with a common identifier (i.e. the email address of the user).

Still yet, the second email 612 is sent over the network to the server 606. The server 606 scans the second email 612 using the predefined rule for which the first portion was met by the first email 604. Thus, the server 606 determines whether the second email 612 meets a second portion of the predefined rule.

As shown, it is determined that the second email 612 meets the second portion of the predefined rule, such that a partial detection of unwanted activity is identified (see operation 614). For example, the second portion of the predefined rule may indicate that social security numbers are a partial detection of unwanted activity, such that the social security numbers included in the second email 612 may meet the second portion of the predefined rule.

In addition, the second email 612 is logged against the email address of the user, as in operation 614. As an option, a notification may be sent to an administrator, the user, etc. for providing a notification of the partial detection. Moreover, as shown in operation 616, the user sends a third email 618 including a list of account numbers. For example, the third email 618 may be sent from the same email address as the first email 604 and the second email 612. In this way, the first email 604, the second email 612 and third email 618 may be associated with a common identifier (i.e. the email address of the user).

The third email 618 is sent over the network to the server 606. The server 606 scans the third email 618 using the predefined rule for which the first portion was met by the first email 604 and the second portion was met by the second email 612. Thus, the server 606 determines whether the third email 618 meets a third portion of the predefined rule.

As shown, it is determined that the third email 618 meets the third portion of the predefined rule, such that a threshold is met (see operation 620). For example, the third portion of the predefined rule may indicate that account numbers are a partial detection of unwanted activity, such that the account numbers included in the third email 618 may meet the second portion of the predefined rule. Additionally, it may be determined that threshold is met since the first portion, second portion and third portion of the predefined rule have been met by emails with the common identifier. As an option, first portion, second portion and third portion may encompass all of the portions of the predefined rule. Furthermore, an action may optionally be performed in response to the determination that the threshold is met, such as blocking the first email 604, the second email 612 and/or the third email 618.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product, embodied on a non-transitory computer readable medium, for performing operations comprising:
    determining whether a first event including a first communication of data satisfies a predefined rule;
    scoring the first event to produce a first result based on at least one of a social security number, an account number, a birthdate, a name, and an account name included in the first event;
    identifying a second event based on an identifier of the first event and an identifier of the second event, wherein the second event includes a second communication of data separate from the first communication of data;
    scoring the second event to produce a second result based on at least one of a social security number, an account number, a birthdate, a name, and an account name included in the second event;
    determining whether an aggregate score of the first and second results exceeds a threshold indicated in the predefined rule, in response to a determination that a time between an identification of the first event and the identifying the second event is within a temporal proximity; and
    performing a reaction in response to a determination that the aggregate score of the first and second results exceeds the threshold indicated in the predefined rule.

2. The computer program product of claim 1, wherein at least one of the first and second events includes posting data on a web page.

3. The computer program product of claim 1, wherein the reaction includes blocking at least one of the first and second events.

4. The computer program product of claim 1, wherein the reaction includes quarantining at least one of the first and second events.

5. The computer program product of claim 1, wherein the identifier of the first event is a domain common with the identifier of the second event.

6. The computer program product of claim 1, the operations further comprising:
    scanning the first and second events utilizing a plurality of predefined rules for determining whether the first and second events satisfy any of the plurality of predefined rules.

7. The computer program product of claim 1, wherein the threshold includes a predetermined number of instances of a type of content of the first and second events.

8. The computer program product of claim 1, wherein the first and second events are originated by different devices.

9. The computer program product of claim 1, wherein the identifier of the first event and the identifier of the second event each include an Internet protocol (IP) address.

10. The computer program product of claim 1, wherein the first and second communications are e-mail communications.

11. The computer program product of claim 1, wherein the identifier of the first event is an address of a source of the first event, and the identifier of the second event is an address of a source of the second event.

12. The computer program product of claim 1, wherein the identifier of the first event is an address of a destination of the first event, and the identifier of the second event is an address of a destination of the second event.

13. The computer program product of claim 1, wherein the identifier of the first event is an email address common with the identifier of the second event.

14. A security system, comprising:
a processor coupled to a memory, wherein
the processor is configured to
  determine whether a first event including a first communication of data satisfies a predefined rule;
  score the first event to produce a first result based on at least one of a social security number, an account number, a birthdate, a name, and an account name included in the first event;
  identify a second event based on an identifier of the first event and an identifier of the second event, wherein the second event includes a second communication of data separate from the first communication of data;
  score the second event to produce a second result based on at least one of a social security number, an account number, a birthdate, a name, and an account name included in the second event;
  determine whether an aggregate score of the first and second results exceeds a threshold indicated in the predefined rule, in response to a determination that a time between an identification of the first event and an identification of the second event is within a temporal proximity; and
  perform a reaction in response to a determination that the aggregate score of the first and second results exceeds the threshold indicated in the predefined rule.

15. The security system of claim 14, wherein the identifier of the first event is an address of a source of the first event, and the identifier of the second event is an address of a source of the second event.

16. The security system of claim 14, wherein the identifier of the first event is an address of a destination of the first event, and the identifier of the second event is an address of a destination of the second event.

17. The security system of claim 14, wherein the identifier of the first event is an email address common with the identifier of the second event.

18. A method to be performed in conjunction with a processor and a memory, the method comprising:
  determining whether a first event including a first communication of data satisfies a predefined rule;
  scoring the first event to produce a first result based on at least one of a social security number, an account number, a birthdate, a name, and an account name included in the first event;
  identifying a second event based on an identifier of the first event and an identifier of the second event, wherein the second event includes a second communication of data separate from the first communication of data;
  scoring the second event to produce a second result based on at least one of a social security number, an account number, a birthdate, a name, and an account name included in the second event;
  determining whether an aggregate score of the first and second results exceeds a threshold indicated in the predefined rule, in response to a determination that a time between an identification of the first event and the identifying the second event is within a temporal proximity; and
  performing a reaction in response to a determination that the aggregate score of the first and second results exceeds the threshold indicated in the predefined rule.

19. The method of claim 18, wherein the identifier of the first event is an address of a source of the first event, and the identifier of the second event is an address of a source of the second event.

20. The method of claim 18, wherein the identifier of the first event is an address of a destination of the first event, and the identifier of the second event is an address of a destination of the second event.

* * * * *